United States Patent [19]

Tanasawa et al.

[11] 4,398,513

[45] Aug. 16, 1983

[54] INTERNAL COMBUSTION ENGINE

[75] Inventors: Yasusi Tanasawa; Tadakuni Hayashi, both of Nagoya; Norio Muto, Aichi, all of Japan

[73] Assignee: Kabushiki Kaisha Toyota Chuo Kenkyusho, Aichi, Japan

[21] Appl. No.: 115,888

[22] Filed: Feb. 28, 1980

[30] Foreign Application Priority Data

Feb. 30, 1979 [JP] Japan .................................. 54-10758
Feb. 30, 1979 [JP] Japan .................................. 54-10759

[51] Int. Cl.$^3$ ............................................ F02B 19/08
[52] U.S. Cl. .................................... 123/255; 123/263; 123/269
[58] Field of Search ............... 123/254, 255, 259, 260, 123/261, 262, 263, 275, 289, 286, 287, 288, 290, 291, 292, 293

[56] References Cited

U.S. PATENT DOCUMENTS

| | | | |
|---|---|---|---|
| 3,304,922 | 2/1967 | Hideg | 123/255 X |
| 3,924,584 | 12/1975 | Decker | 123/284 X |
| 4,005,684 | 2/1977 | Habu | 123/255 |
| 4,068,626 | 1/1978 | Fiedler | 123/255 |
| 4,221,193 | 9/1980 | Ezoe et al. | 123/483 |

Primary Examiner—Tony M. Argenbright

Attorney, Agent, or Firm—Oblon, Fisher, Spivak, McClelland & Maier

[57] ABSTRACT

An internal combustion engine according to the present invention includes a piston reciprocally movable within a cylinder for affording rotational motions to a crankshaft, a combustion chamber formed among the piston, the cylinder and a cylinder head, an intake valve mechanism for opening and closing an intake passage to be communicated with the combustion chamber, igniting means having its igniting portion facing the combustion chamber, fuel supply means for supplying a predetermined quantity of fuel toward a predetermined wall of the combustion chamber, which is heated to a predetermined high temperature by the combustion in the combustion chamber, and an exhaust valve mechanism for opening and closing an exhaust passage to be communicated with the combustion chamber. During the running operation, the fuel is brought by the fuel supply means into contact with the predetermined wall having the predetermined high temperature of the combustion chamber, which is evaporated from the surface of the wall, so that the gasification of the fuel is promoted to effect combustion with high efficiency and to prevent emission of unburned noxious contents such as hydrocarbons.

9 Claims, 33 Drawing Figures

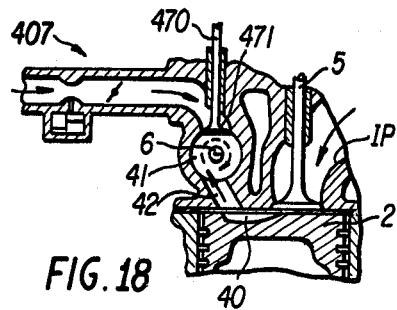
FIG. 18
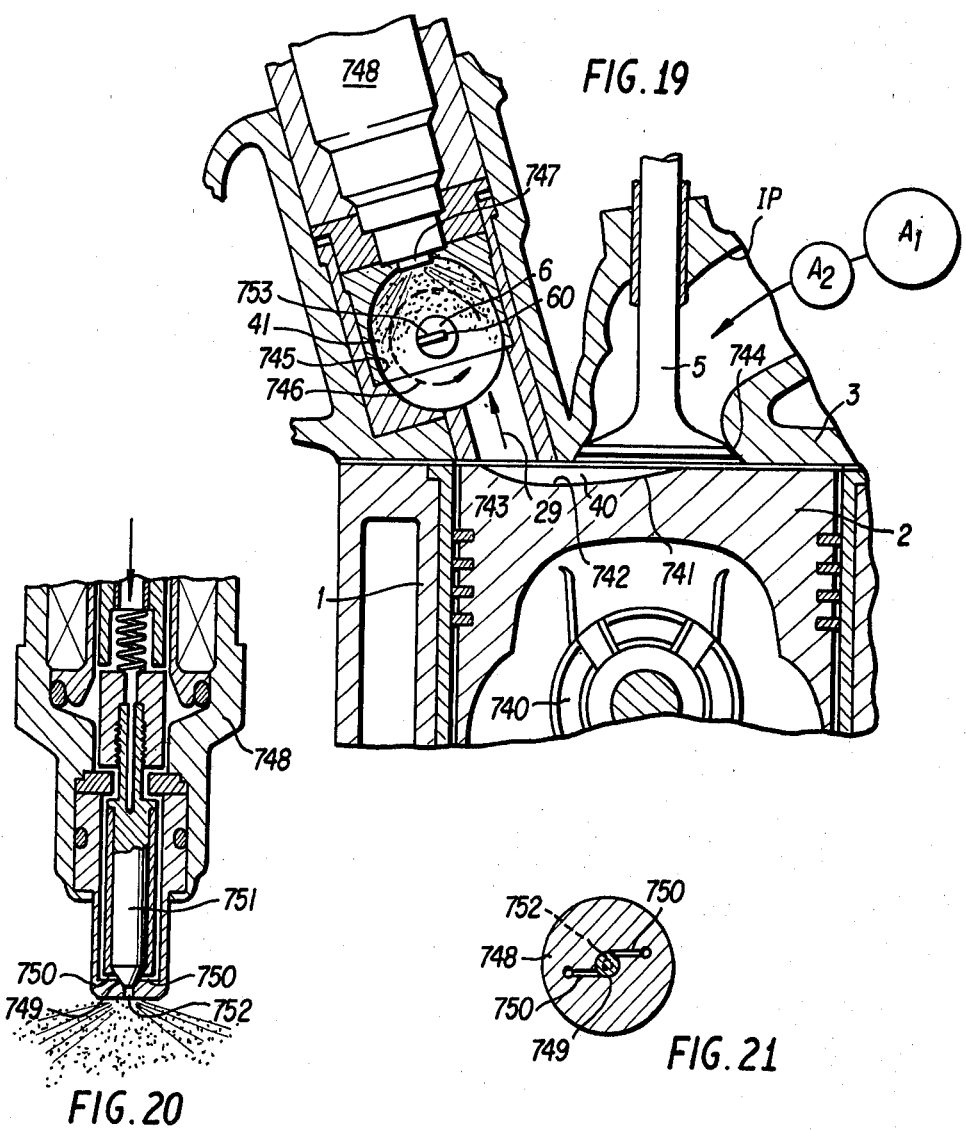
FIG. 19
FIG. 20
FIG. 21

INTERNAL COMBUSTION ENGINE

BACKGROUND OF THE INVENTION

1. Field of the Invention

The present invention relates to an internal combustion engine, in which a fuel is injected to a preset or predetermined wall of a combustion chamber so that it may be instantly evaporated therefrom and completely burned thereby prevent the emission of hydrocarbons.

2. Description of the Prior Art

Conventionally, a gasoline engine has had a problem that, although the combustion temperature has had to be lowered with a view to eliminating the noxious content in the engine exhaust gases of nitrogen oxides (NOx), an unburned noxious content such as hydrocarbons have been produced to deteriorate the combustion efficiency if the combustion temperature is lowered.

Therefore, a variety of combustion methods and gasoline engines have been studied and developed to enhance the combustion efficiency, without producing an unburned noxious content such as hydrocarbons, under the condition in which the combustion temperature is lowered to restrain the emission of nitrogen oxides (NOx).

It is, however, the present state of the art that this object cannot be sufficiently accomplished because the particles of fuel supplied to the combustion chamber (or cylinder) have large diameters.

A feature of the present invention resides in that the fuel to be burned in the combustion chamber is atomized into fine particles.

In the following experiments, gasoline was used as a typical example of a fuel for an internal combustion engine.

In an internal combustion engine, as illustrated in FIG. 1, if fuel vapors are continuously supplied from an intake passage IP having air (AR) flow therein, through an intake valve IV, into a combustion chamber (or cylinder) CC, the fuel is substantially completely burned in the cylinder.

FIG. 2 illustrates the results of the emissions of the total hydrocarbons THC left unburned (or unburned gasoline), which were measured by normally running a four-cylinder fourcycle gasoline engine having a displacement of about 400 cm$^3$ per cylinder and a compression ratio of about 8.5 under the fixed conditions of revolutions per minute n=1500 r.p.m., charge of air per second=13.5 g/s and torque=5 Kg·m while changing the air-fuel ratio A/F of a combustible mixture. As will be understood from FIG. 2, the emissions of the hydrocarbons HC were at low level where the gasoline was in a vapour state, and the results were little changed whether gasoline vapor injection nozzle VN was placed at position A or position B.

As will be understood from FIG. 3, moreover, the combustion efficiency was enhanced to thereby reduce the fuel consumption rate.

If, on the contrary, a small pipe SP is formed with a small hole having a diameter of 0.15 mm, as shown in FIG. 4, to supply a continuous flow of gasoline in a liquid state from the vicinity of the intake valve, the emissions of the hydrocarbons HC are varied in the manner shown in FIG. 5 as the positions and directions of arrangement of the hole are changed in the manners shown at A, B, C, D, E and F.

If fuel is supplied at a right angle to the intake passage IP from the point A which is spaced at some distance from the intake valve IV, the gasoline in the hot intake passage is sufficiently heated into vapors so that the emissions of the hydrocarbons are reduced to such a low level as is equal to that of the case, in which the gasoline is supplied in the vapor state.

Conversely, if the fuel supply is directed straight toward the intake valve IV from the position E, the gasoline is left unvaporized and is supplied to the combustion chamber in the form of liquid flow so that the emissions of the hydrocarbons are increased to high levels.

Moreover, the combustion efficiency $\eta_b$ can reach as high as 97 to 98% in the case of the supply from the point A but falls to 90% in the case of the supply from the point E, as shown in FIG. 6.

As has already been understood from these experimental results, where the gasoline engine is run under stable conditions, it is not always necessary to atomize the gasoline to be supplied to the intake passage into fine particles, which is contrary to the prevailing concept, and the gasoline can be completely burned similarly to the case of the vaporized state, even if it is not atomized in the least but is supplied in the form of a liquid flow to the intake passage upstream of the intake valve.

Upon considering the causes, it has been found that, if the liquid flow into the intake passage is completely gasified into a vapor state immediately before the gasoline is ignited in the combustion chamber (or cylinder) even where the gasoline is supplied in the form of the liquid flow, similar results can be obtained to those of the case in which the gasoline is supplied in the vapor state.

As to the supplying method of the gasoline, in other words, it is necessary to promote not only the gasification of the gasoline in the intake passage but also the gasification of the gasoline sucked into the combustion chamber (or cylinder), and it has been found that the latter is especially important, for preventing the production of an unburned content such as hydrocarbon.

Generally speaking, the gasoline sucked in the engine cylinder is partly atomized into fine particles and partly formed into a liquid film while it is passing through the intake valve.

If the fine particles are brought into a condition under which they are floating in the cylinder, their gasification is effected by the heat transfer between the liquid particles and the surrounding gases so that the gasifying rate is lowered.

If, on the contrary, the gasoline particles are brought into contact with a hot solid surface such as the inner wall of the combustion chamber, the head portion of the piston or the exhaust valve, they are instantly evaporated so that the gasifying rate is remarkably increased.

FIGS. 7(A) and 7(B) illustrate the results of the gasifying rates which were calculated on the basis of studies which have been made by the inventors. FIG. 7(A) plots the time necessary for the gasoline droplets having a diameter of 100 microns to finish their gasification during the intake stroke, whereas FIG. 7(B) plots the time necessary for the gasoline droplets having a diameter of 100 microns to finish their gasification during the compression stroke. In FIG. 7(A), moreover, curve 1 is plotted in the case where the gasoline droplets are floating in hot gases under a pressure of 1 atm, whereas curve 2 is plotted in the case where the gasoline droplets in gases under a pressure of 1 atm are brought into contact with the hot solid surface. In FIG. 7(B), on the other hand, curve 3 is plotted in the case where the gasoline droplets are floating in hot gases under a pressure of 11 atms, whereas curve 4 is plotted in the case where the gasoline droplets in gases under a pressure of 11 atms are brought into contact with the hot solid surface.

In other words, the curves 1 and 3 illustrate the times necessary for the gasoline droplets having the diameter of 100 microns to be gasified while floating in the hot gases.

In the case where the four-cycle engine is turned at 1500 r.p.m., its suction and compression strokes are completed in $(60s/1500)/2 = 20$ ms, respectively.

In an actual engine, however, since the average temperature and pressure of the mixture during the suction stroke are 100 to 150° C. and about 1 atm (ata), respectively, a time of 300 to 160 ms is required for complete evaporation so that little gasification takes place during the suction stroke. Since the average temperature and pressure during the compression stroke are increased to 325° C. and about 11 atm (ata), respectively, a time of about 18 ms required for the complete gasification can be almost finished during the compression stroke.

On the other hand, the times required for gasification for the case in which the gasoline droplets having a diameter of 100 microns come into contact with the hot solid surface are illustrated in the curve 2 for the suction stroke and in the curve 4 for the compression stroke. Thus, the gasification can be almost instantly finished if the temperature of the solid surface is raised close to the maximum evaporation rate point a in FIG. 7(A). The point b appearing in FIG. 7(A) is the so-called "Leydenfrost" point. If the solid surface is maintained at the Leydenfrost point, the gasoline droplets do not form a liquid film on the solid surface, when they come into contact, but jump up in a round shape into the hot gases.

The experimental results thus far described are obtained for the gases under stationary conditions. In case the gases are flowing while becoming turbulent, the time necessary for the gasification will be reduced to about from (1/5) to (1/7) of that of FIGS. 7(A) and 7(B).

Even in that case, however, it can be deduced that the time for gasification is far shorter for the case of contacting with a solid surface than for the case of floating in the gases.

Generally speaking, the diameter of the atomized droplets to be sucked into the combustion chamber (or cylinder) is frequently larger than 100 microns. In this case, it is far more advantageous that the droplets are brought into contact with a solid surface.

As the revolutions per minute of the engine are increased, the durations of the suction and compression strokes become shorter than 20 ms so that the aforementioned effects are further improved.

SUMMARY OF THE INVENTION

In view of the aforementioned experiments conducted by the inventors and the aforementioned phenomena deduced by the theoretical analysis and taking place in the combustion chamber (or cylinder), it is therefore an object of the present invention to provide an internal combustion engine in which fuel supplied to the combustion chamber is instantly brought into contact with such a preset wall of the combustion chamber as corresponds to the hot solid surface so that its gasification may be promoted to prevent the emission of unburned noxious contents such as hydrocarbons (HC).

A primary object of the present invention is to provide an internal combustion engine which allows fuel to be brought into contact with a predetermined wall surface of a combustion chamber during the running operation of the engine and to be instantly evaporated therefrom.

Another object of the present invention is to provide an internal combustion engine which promotes the gasification of the fuel to effect the combustion highly efficiently, to prevent emission of unburned noxious contents such as hydrocarbons and to improve the fuel consumption rate.

Still another object of the present invention is to provide an internal combustion engine which allows the fuel to be injected from an annular guide space formed between an intake valve and an annular groove formed at a valve seat of an intake passage and arranged to face a predetermined wall of the combustion chamber.

A further object of the present invention is to provide an internal combustion engine which is free from any restriction as to the mechanism and arrangement of the existing intake valve.

A still further object of the present invention is to provide an internal combustion engine which injects the fuel at the most proper angle and from the most proper position to a predetermined wall of the combustion chamber.

A further object of the present invention is to provide an internal combustion engine which has a good engine response and is free from the drawback that the fuel stays in the intake valve because of the direct injection of the fuel into the combustion chamber.

A further object of the present invention is to provide an internal combustion engine which allows fuel to be brought into contact with the substantially whole area of an inner wall of a first combustion chamber as an auxiliary combustion chamber and to be evaporated therefrom thereby to promote its gasification.

A further object of the present invention is to provide an internal combustion engine which allows the fuel to be injected into the inner wall of the auxiliary combustion chamber by means of an auxiliary intake valve mechanism for controlling the communication between the auxiliary combustion chamber and the auxiliary intake passage.

A further object of the present invention is to provide an internal combustion engine which allows the fuel to be injected into the inner wall of the auxiliary combustion chamber at the most proper angle from the most proper position by a fuel injector having its injection port facing the first combustion chamber.

A further object of the present invention is to provide an internal combustion engine which is free from any restriction as to the position and direction of arrangement of the injection valve.

A further object of the present invention is to provide an internal combustion engine which allows the fuel to be injected into substantially whole area of an inner wall of the first combustion chamber with the aid of the action of vortex or swirling flows generated in the first combustion chamber.

A further object of the present invention is to provide an internal combustion engine which can enjoy an advantage that it can be put into practice without any difficulty.

The internal combustion engine according to the present invention is constructed to comprise a piston made reciprocally movable within a cylinder for affording rotational motions to a crankshaft, a combustion chamber to be formed among said piston, said cylinder and a cylinder head. An intake valve mechanism opens and closes an intake passage to be communicated with said combustion chamber. An igniting means having its igniting portion facing said combustion chamber, fuel supply means for supplying a predetermined quantity of the fuel toward a predetermined wall of the combustion chamber, which is heated to a predetermined high temperature by the combustion in said combustion chamber, and an exhaust valve mechanism for opening and closing an exhaust passage to be communicated with said combustion chamber are also provided.

The internal combustion engine having the aforementioned construction according to the present invention can enjoy the operational effect that the fuel is brought during the running operation by said fuel supply means into contact with the predetermined wall of the combustion chamber, which is heated to said predetermined high temperature, and is evaporated from the surface of said predetermined wall so that the gasification of the fuel may be promoted to effect the combustion efficiently and to prevent emission of unburned noxious contents such as hydrocarbons.

In the present invention, moreover, as the predetermined wall of the combustion chamber for evaporating the fuel supplied from fuel supply means from the surface thereof to completely gassify the same, there can be utilized the head portion of said piston, the lower flat portion of the exhaust valve, the wall of an auxiliary combustion chamber, and the upper wall portion of said combustion chamber excepting said exhaust valve and the intake valve, all of which are heated to a temperature about 200° C. during the combustion, and it is sufficient to supply the fuel in the form of a jet to one or more of those portions from said fuel supply means.

The present invention includes the following aspects when it is put into practice.

According to a first aspect of the present invention, said fuel supply means is constructed to include a fuel injecting device for supplying a predetermined quantity of fuel into the intake passage, such as a fuel injector for injecting a metered or regulated quantity of fuel into either said intake passage or a carburetor having its venturi and nozzle portions arranged in said intake passage, and an annular groove, formed at a valve seat of the intake valve so that an annular guide space is formed between said intake valve and the annular groove and is arranged to face the predetermined wall of the combustion chamber, which is heated to said high temperature by combustion. As a result, the gas mixture of air and fuel droplets, which has been sucked in the intake passage during the suction stroke, is supplied in the form of a jet from said annular guide space to that predetermined wall of the combustion chamber, which is heated to said high temperature, thereby to effect the evaporation of the fuel from the surface of said heated wall of the combustion chamber.

In the internal combustion engine equipped with a usual carburetor or an injector for effecting its injection into the intake pipe, the geometrical shape of the combustion chamber in the vicinity of the intake valve is made into a nozzle or groove so that the mixture of the fuel droplets and air sucked during the suction stroke is made to instantly impinge in the form of a jet upon the inner or upper wall of the combustion chamber, the head portion of the piston or the exhaust valve thereby effecting the evaporation therefrom.

As a result, the gasification of the fuel droplets is effected instantly, and all the fuel is evaporated by ignition time so that neither liquid droplet nor film exists to ensure the complete combustion, thereby to reduce the emission of the hydrocarbons and the fuel consumption rate.

According to a second aspect of the present invention, moreover, said fuel supply means is constructed to include a fuel injector having its injection port opening into said combustion chamber and directed toward the predetermined wall of the combustion chamber which is heated to said high temperature, whereby the droplets of a metered quantity of the fuel supplied from said injection port are evaporated from the surface of said predetermined high temperature wall.

According to the second aspect of the present invention, the so-called "direct injection type fuel injector" for injecting fuel directly into the combustion chamber is employed to have its injection port directed toward the inner wall of the combustion chamber, which is heated to a temperature of about 200° C. during combustion, i.e., the head portion of the piston, the lower flat portion of the exhaust valve, and the upper wall portion of the combustion chamber excepting the exhaust valve and the intake valve. Thus, the fuel is injected from said injection port to the aforementioned predetermined wall portion of the combustion chamber and is able to be evaporated from the surface of said wall so that its gasification may be promoted to substantially completely evaporate the fuel by the ignition time thereby to effect highly efficient combustion, thus improving the fuel consumption rate and preventing the emission of unburned noxious contents such as hydrocarbons.

Since it is sufficient to arrange the injection port of the direct injection type fuel injector in the combustion chamber, the present second aspect is free from any restriction as to the mechanism and arrangement of the existing intake valve, contrary to the aforementioned first aspect. Thus, the second aspect can enjoy not only an advantage that a metered quantity of fuel can be injected at the most proper angle from the most proper position to the predetermined wall of the combustion chamber but also another advantage that the response of the engine can be improved, while being free from the drawback of the fuel remaining in the intake passage, because all the fuel is injected directly into the combustion chamber.

According to a third aspect of the present invention, the combustion chamber comprises a first combustion chamber formed within the cylinder head and a second combustion chamber communicated with the first combustion chamber through a communication port, and the fuel supply means has its supply port arranged in a predetermined position of an inner wall of the first combustion chamber communicated with the second combustion chamber through the communication port thereby to supply the fuel to substantially the whole area of the inner wall of the first combustion chamber so that the fuel supplied may be evaporated from the surface of the inner wall of the first combustion chamber.

According to the third aspect of the present invention, more specifically, it is taken into account that the inner wall of the auxiliary combustion chamber (which will be referred to a first combustion chamber) of an internal combustion engine is heated to a temperature as high as about 200° C. during the running operations of the engine. If the jet of the fuel is brought to substantially the whole area of the inner wall of the first combustion chamber, the fuel is evaporated from the inner wall of the first combustion chamber which is heated to the predetermined temperature to promote its gasification so that it may be substantially completely evaporated by ignition time, thereby to effect combustion highly efficiently, thus improving the fuel consumption rate and preventing the emissions of unburned noxious contents such as hydrocarbons.

The third aspect according to the present invention thus far described may take the three following forms when it is put into actual practice.

The internal combustion engine according to a first example of this third aspect is constructed to have its fuel supply means including a carburetor having its venturi and nozzle portions arranged in an auxiliary intake passage having communication with the first combustion chamber, and an auxiliary intake valve mechanism for controlling the communication between the first combustion chamber and said auxiliary intake passage in synchronism with the rotations of said crankshaft.

In the internal combustion engine having the aforementioned construction according to the first example, more specifically, the jet of the mixture of the metered fuel and air from the auxiliary intake valve mechanism is brought into contact with the inner wall of the first combustion chamber, which is heated to a temperature of about 200° C., so that the fuel can be evaporated from the surface of that wall. By this, the gasification of the fuel is promoted so that it may be substantially completely evaporated by ignition time to make highly efficient combustion possible thereby to improve the fuel consumption rate and to prevent the emission of the unburned noxious contents such as hydrocarbons. If the first example thus far described resorts to an intake valve mechanism having an inverted T-shaped longitudinal section, which is often used in the conventional gasoline engine with an auxiliary combustion chamber, the jet of the fuel is diverged at the bottom so that the fuel can be easily supplied to the inner wall of the first combustion chamber. Thus, it is sufficient that the position and direction of arrangement of the auxiliary intake valve mechanism be taken into consideration with respect to the first combustion chamber.

According to a second example of the internal combustion engine, on the other hand, said fuel supply means comprise a fuel injector having its injection port of a wide injection angle opening into the first combustion chamber and directed toward the inner wall of the first combustion chamber for injecting a metered quantity of the fuel from said injection port in a predetermined timing in a synchronism with the rotations of said crankshaft at such a wide injection angle as can cover substantially the whole area of the inner wall of the first named combustion chamber.

In the internal combustion engine having the aforementioned construction according to the second example of this third aspect, more specifically, since the metered fuel is injected from the injection port to the substantially whole area of the inner wall of the first combustion chamber, the surface evaporation of the fuel from the whole inner wall of the first combustion chamber is made possible to promote the gasification of the fuel so that the fuel may be substantially completely evaporated by ignition time thereby to make highly efficient combustion possible, thus improving the fuel consumption rate and preventing the emission of unburned noxious contents such as hydrocarbons. Moreover, since the fuel is injected directly into the first combustion chamber forming a part of the combustion chamber in a similar manner to the aforementioned second aspect according to the present invention, the present second example of this third aspect is free from any restriction as to the position and direction of arrangement of the injection valve so that it can enjoy the advantage that the injection can be performed at the most proper angle from the most proper position to the inner wall of the first combustion chamber as well as the advantage that the response of the engine can be improved.

According to a third example of the third aspect in the present invention, the internal combustion engine further comprises vortex or swirl forming means for forming vortex or swirling flows having a high turning velocity within the first combustion chamber. The fuel supply means has its supply port arranged in a preset position on the wall of the first combustion chamber, which has communication with a second combustion chamber through a tangential communication port as the vortex forming means so that vortex or swirling flows having a high turning velocity may be generated therein, thereby to supply the fuel to substantially all the area of the inner wall of said first combustion chamber with the aid of the actions of said vortex flows so that the fuel supplied may be evaporated from the surface of the inner wall of said first combustion chamber.

In the third example of the third aspect according to the present invention, thus constructed, the fuel is positively brought into contact with the substantially whole area of the inner wall of the first combustion chamber by the actions of the fuel supply means and the vortex or swirling flows so that it may be evaporated from the surface of the inner wall, and the evaporated fuel and the air are sufficiently mixed by the vortex or swirling flows and the resultant mixture is ignited substantially at the center of the vortex or swirling flows so that the flame jet is supplied to the second combustion chamber to make highly efficient combustion possible thereby to improve the fuel consumption rate and to prevent the emission of unburned contents such as hydrocarbons. Thus, the present third example has an advantage that the fuel is brought by the actions of the fuel supply means and the vortex or swirling flows into reliable and prompt contact with the whole area of the inner wall of the first combustion chamber while promoting its evaporation from the wall surface so that the evaporated fuel and the air can be sufficiently mixed by the vortex or swirling flows.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 18 is a sectional view showing the fifth embodiment of the present invention;

FIGS. 19, 20 and 21 are, respectively, a sectional view showing the sixth embodiment of the present invention, a partially enlarged longitudinal sectional view of the fuel injector of the sixth embodiment and a transverse sectional view of the fuel injector shown in FIG. 20;

DETAILED DESCRIPTION OF THE PREFERRED EMBODIMENTS

Figure 1:
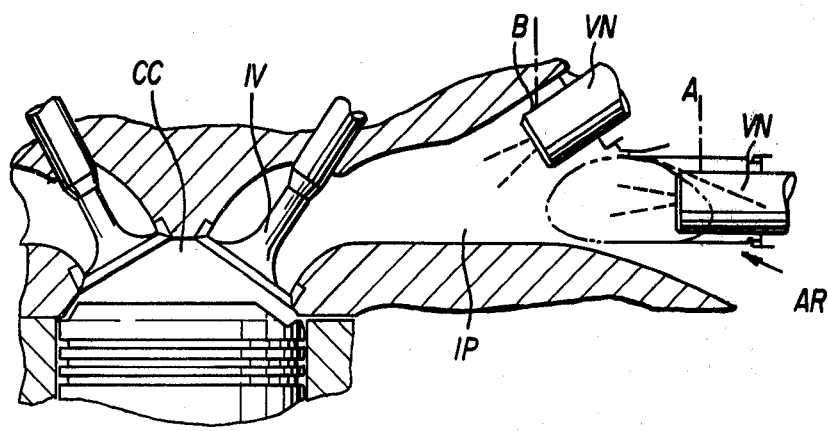
FIGS. 1 to 6, 7a, and 7b are illustrative views showing the experimental examples, their data and the analytic data.
Figure 2:
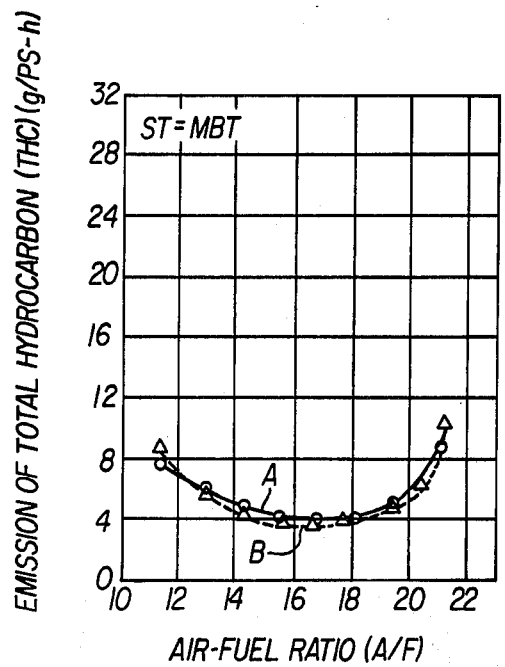
Figure 4:
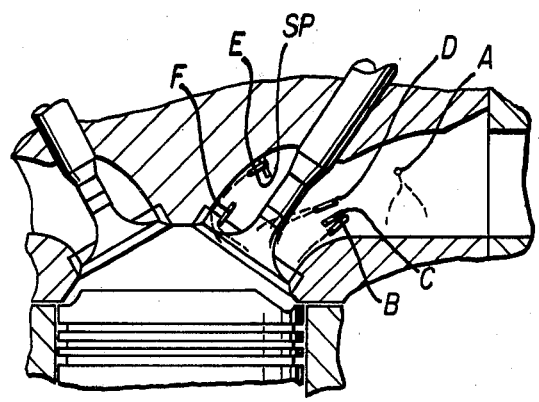
Figure 3:
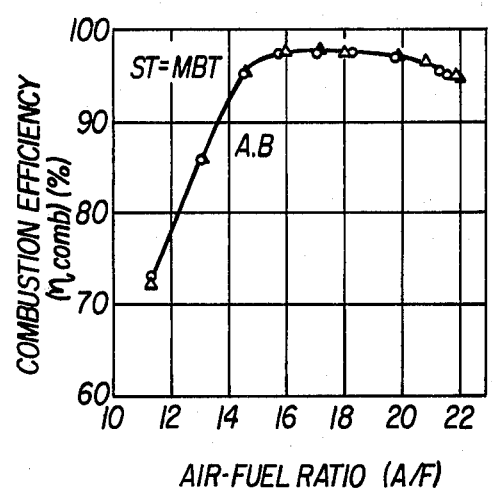
Figure 5:
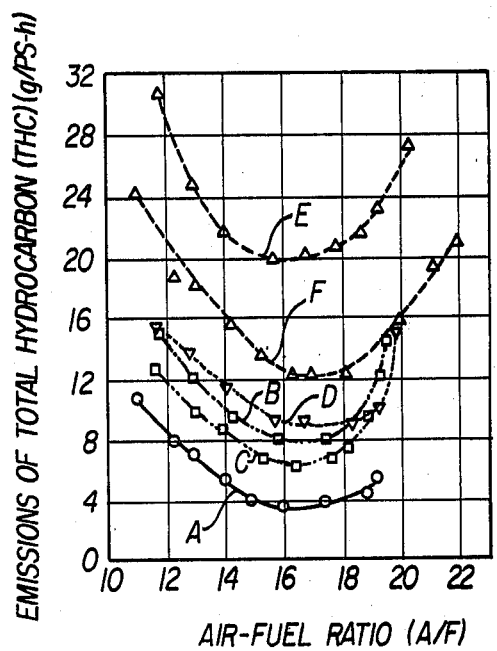
Figure 6:
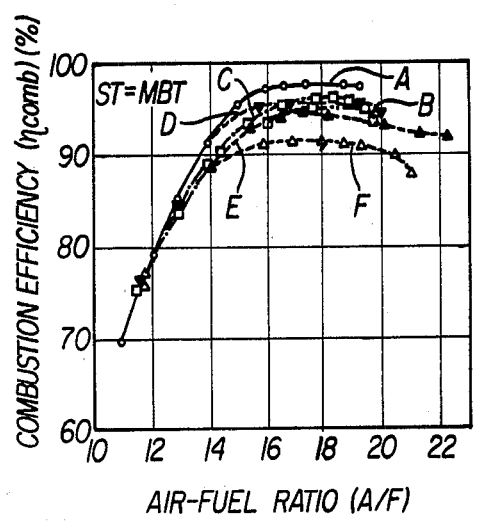
Figure 7A:
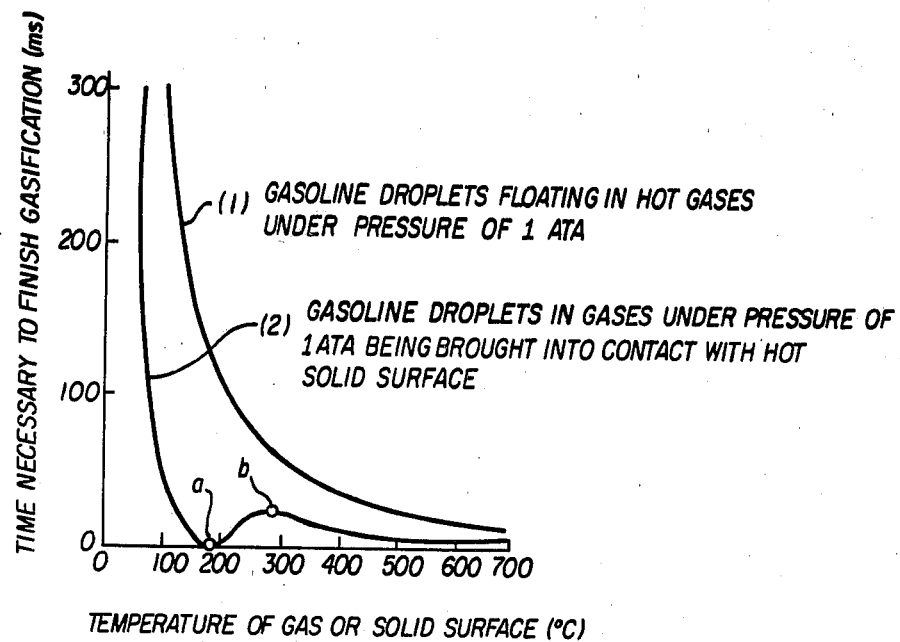
Figure 7B:
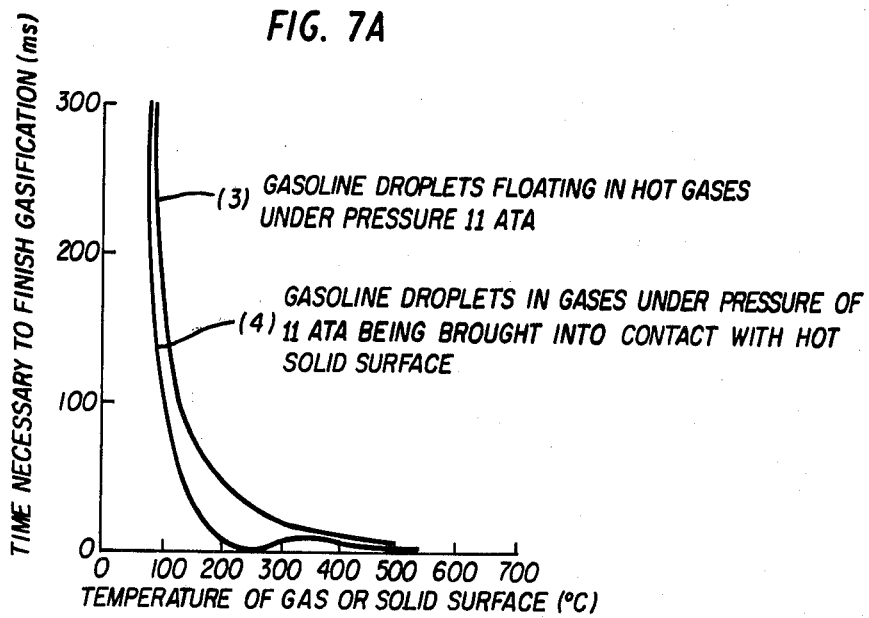

The internal combustion engine according to a first embodiment is a reciprocating gasoline engine having a usual carburetor, to which the present invention is applied, and belongs to the aforementioned first aspect of the present invention. The internal combustion engine according to the first embodiment will now be described in detail with reference to FIG. 8.

A piston 2, which is retained on a crankshaft through a connecting rod, is fitted in a cylinder bore 11, which is formed in a cylinder block 1, such that it is made reciprocally movable within said cylinder bore. The piston 2 has its upper portion 20 formed with an annular recess 21 which has an undulating W-shaped longitudinal section. A cylinder head 3, which is fixedly placed on the head of the cylinder block 1, has its lower portion formed with a conical recess 30 which constitutes the upper wall of a combustion chamber 4 and which has a substantially V-shaped longitudinal section. There are arranged in the head an intake passage IP and an exhaust passage EP such that they are opened into said conical recess 30. In two openings of the aforementioned conical recess 30 which lead into said intake passage IP and said exhaust passage EP, there are hermetically arranged an intake valve mechanism 5 and an exhaust valve mechanism 8 having an inverted T-shaped longitudinal section, both of which are reciprocally moved up and down by such cam shafts as are turned cooperatively and synchronously with the crankshaft, respectively.

Igniting means 6 is constructed such that the igniting portion of an ignition plug connected to an igniting circuit is arranged to face the upper portion of the combustion chamber 4 thereby to ignite the gasoline as a fuel.

Figure 8:
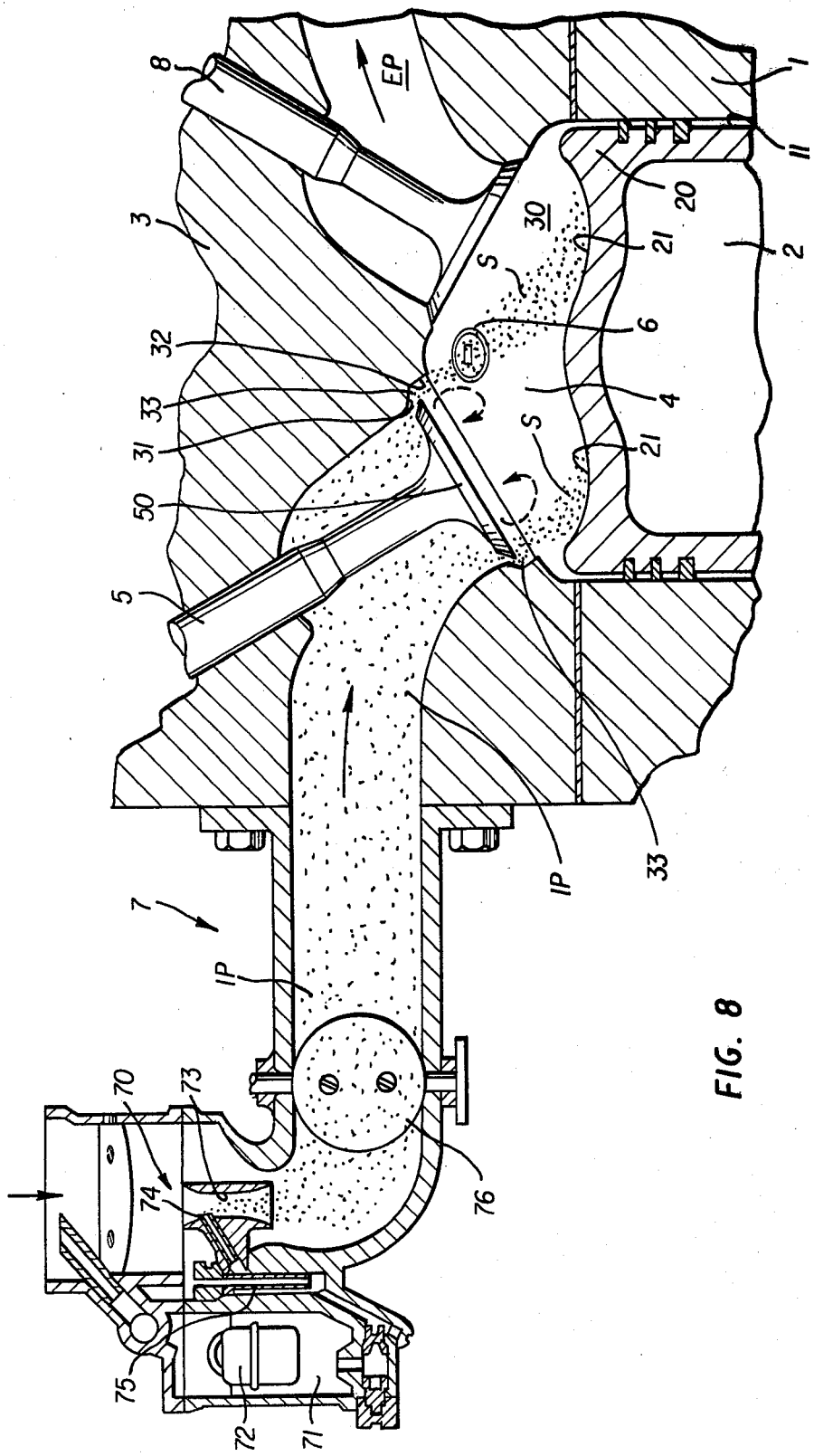
FIG. 8 is a sectional view showing a first embodiment of the present invention.

The shape in the vicinity of the valve seat 31 of the intake valve mechanism 5 at the side of the combustion chamber 4 is so made as is shown in FIG. 8. There is arranged an annular groove 32 formed at a valve seat 31 of the intake valve; which groove is directed toward the annular recess 21 of the aforementioned piston 2. When the intake valve 5 is opened, an annular clearance 33 as an annular guide space which is formed between the intake valve 5 and the annular groove 32 slightly changes its direction so that it has communication with the aforementioned annular groove 32.

Upstream of the intake passage IP, there are arranged both a float 72 in a float chamber 71 and a usual carburetor 70, which is equipped with a nozzle 74 opened into a venturi 73 arranged in the intake passage and with an air bleed 75 having communication with the aforementioned float chamber 71. Moreover, downstream of the venturi 73 and the bent portion of the intake passage IP, there is arranged a throttle valve 76 which is made coactive with an accelerator pedal.

The fuel supply means 7 to be used in the present first embodiment is constructed to include the carburetor 70, the aforementioned annular groove 32 and the annular clearance 33 as an annular guide space formed between the intake valve 5 and the annular groove formed at the valve seat 31. The mixture of the gasoline as fuel and air, which has been metered by the carburetor 70 and has flown through the intake passage IP, further passes through the aforementioned annular clearance 33 along the inner wall of the aforementioned annular groove 32 so that it is made to impinge in the form of a jet (which is indicated at letter S in FIG. 8) upon the W-shaped annular recess 21 at the upper portion of the piston 2.

The operational effects of the internal combustion engine having the aforementioned construction according to the first embodiment will be described in the following.

The fuel droplets in the liquid state, which are supplied from the carburetor 70, are sucked through the intake passage IP and the intake valve 5 into the combustion chamber 4 as the suction stroke is started and the piston 2 is accordingly moved downward.

Since, at this time, the annular groove 32 in a cylindrical shape is formed in the upper wall of the combustion chamber 4, as shown in FIG. 8 and the dish-shaped valve member 50 moves to a retracted position from the combustion chamber, the mixture of the fuel droplets and air flowing through the clearance 33 between the intake valve 5 and the cylinder wall is changed into the jet S along the inner wall of the cylindrical annular groove 32 so that it impinges upon the W-shaped recess 21 of the head portion 20 of the piston 2.

As a result, the liquid droplets in the mixture are brought into contact with the W-shaped recess 21 of the head portion 20 of the piston 2.

Since the surface temperature of the head portion of the piston 2 during the running operation of the engine is usually 200° to 300° C., the fuel of a gasoline group is evaporated at its maximum evaportion rate so that it is instantly converted into vapors.

In the case where the revolutions per minute n is 1500 r.p.m., the average velocity $\overline{U}$ of the piston 2 is calculated by the Equation $\overline{U} = nL/30 = 1500 \times 0.07/30 = 3.5$ m/s, and the maximum speed $U_{max}$ of the piston is also calculated by the Equation $U_{max} \approx 1.63\overline{U} = 5.7$ m/s. On the other hand, the speed of the piston is 0 at the TDC point, the maximum value of 5.7 m/s is at the crank angle in the vicinity of 80 degrees, and 0 at the BDC point.

In the case where the pressure difference upstream and downstream, of the intake valve is 0.01 Kg/cm², however, the flow velocity of the mixture jet from the intake valve 5 is 40 m/s. For the pressure difference of 0.02 Kg/cm$^2$, the flow velocity is about 57 m/s. As a result, the mixture intensely impinges upon the W-shaped recess 21 of the head portion 20 of the piston 2 so that the gasoline droplets in the mixture are caught by the W-shaped recess 21 of the head portion 20 of the piston 2 and are started to be evaporated.

As has been described in the above, the jet of the gasoline and air, which is injected from the aforementioned annular clearance 33 and annular groove 32 both constituting the fuel supply means 7, impinges upon the W-shaped recess 21 of the head portion 20 of the piston 2 to evaporate the gasoline therefrom so that the gasification of the gasoline is promoted to enjoy the operational effects that the combustion can be effected highly efficiently, that the fuel consumption rate can be improved and that the unburned noxious contents such as hydrocarbons can be prevented from being emitted.

Since the piston 2 has its head portion 20 formed with the W-shaped recess 31 having a center protrusion, the internal combustion engine according to the present first embodiment can also enjoy the effect that it is possible to eliminate the conventional drawback in which gasoline is left in the center portion to produce unburned gases.

Since, moreover, it is sufficient to slightly change the shape in the vicinity of the valve seat 31 of the intake valve 5, the internal combustion engine according to the first embodiment enjoys an advantage that it can be put into practice without great difficulty.

The description of the present invention will proceed in connection with an internal combustion engine according to a second embodiment of the present invention and which comprises a piston type gasoline engine.

Figure 9:
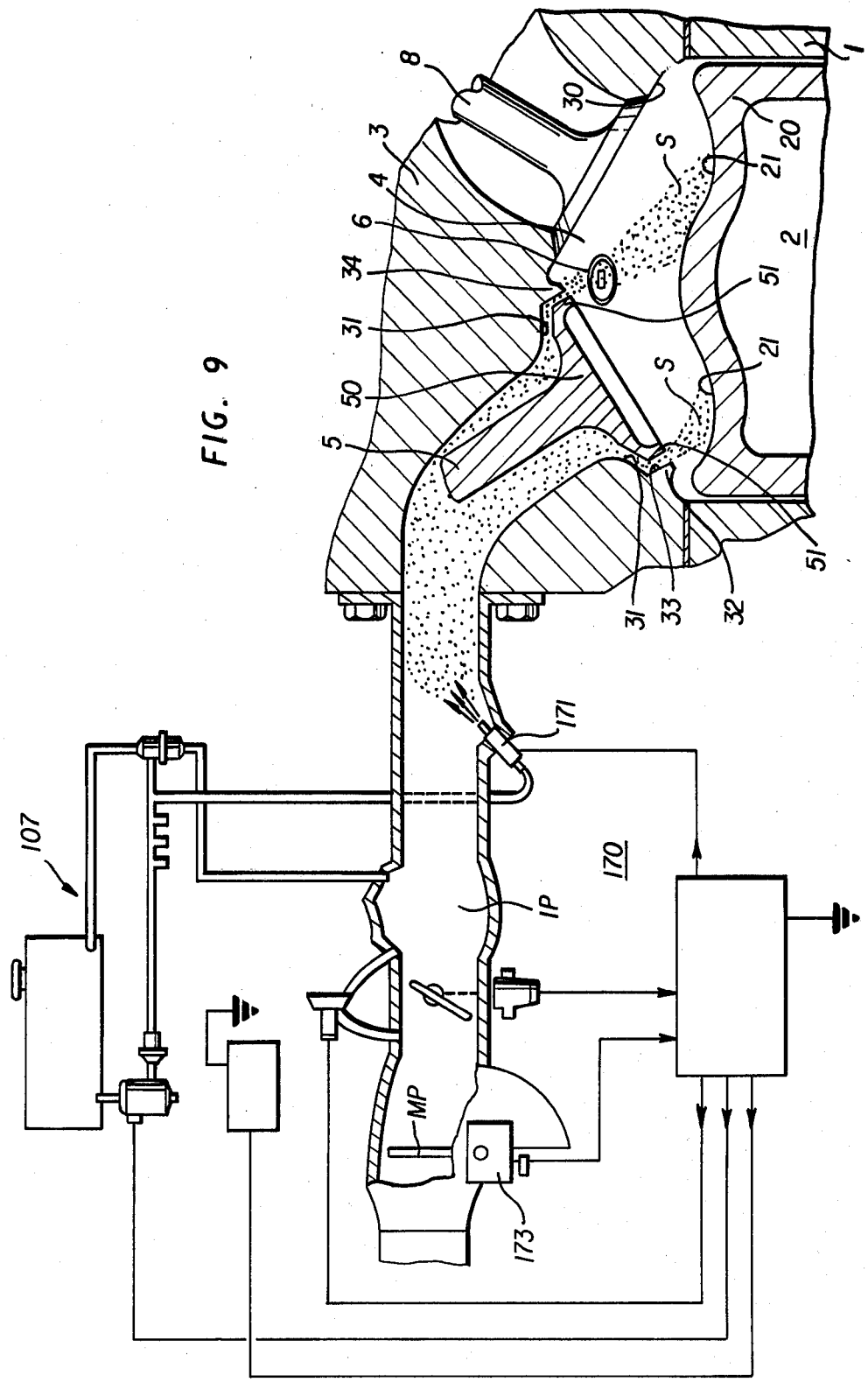
FIG. 9 is also a sectional view showing a second embodiment of the present invention.

As shown in FIG. 9, the internal combustion engine according to the second embodiment belongs to the first aspect of the present invention but is different only in the fuel supply means from the aforementioned first embodiment according to the present invention. More specifically, the differences reside in the points that there is provided an intake passage injector for injecting the fuel into the intake passage IP and that the intake valve 5 has its dish-shaped valve member 50 formed with a skirt portion 51 while the annular groove 32 formed in the valve seat 31 is formed at its lowermost portion, as shown, with an annular projection 34 directed toward the center of the combustion chamber 4. The description will be centralized upon the differences, and identical parts are numbered at identical characters so that their repeated descriptions will be omitted.

An intake passage injector 170 constituting the fuel supply means 107 to be used in the present second embodiment is constructed to include an electromagnetic valve 171, which is an electronic fuel injector of air flow rate detecting type for injecting the gasoline upwardly at an inclination from the intake passage IP to the inner wall of the intake passage IP, an air flow meter 173 for detecting the rate of the air flowing in the intake passage IP in terms of the rotational displacement of a metering plate MP, and a control unit 172 made responsive to the signals from said air flow meter 173 for transmitting to the aforementioned electromagnetic valve 171 both igniting signals and the signals for controlling the quantity of the gasoline injected upon each charge in accordance with the running conditions of the engine while taking the temperature of the engine cooling water into consideration.

The intake valve 5 has its dish-shaped valve member 50 formed with the skirt portion 51. Moreover, the annular projection 34 is formed along the annular groove 32 of the valve seat 31 of the cylinder head 3.

Since the gasoline-air mixture which has been metered by the electronic fuel injector 170 is supplied along the intake valve 5 and through the parallel clearance 33 between the skirt portion 51 and the annular groove 32 together with the annular projection 34 of the valve seat 31 and is made to impinge in the form of a jet upon the W-shaped recess of the head portion 20 of the piston so that the gasoline may be evaporated from the surface thereof, the internal combustion engine having the aforementioned construction according to the second embodiment can enjoy the operational effects that the combustion can be accomplished highly efficiently, that the fuel consumption rate can be improved and that the unburned noxious contents such as hydrocarbons can be prevented from being emitted, because the gasoline is substantially completely gasified by the time of ignition.

By forming the skirt portion 51 in the intake valve 5 and the projection 34 in the valve seat 31, moreover, the parallel clearance 33 is formed so that the flow speed of the jet of the gasoline-air mixture can be increased to stabilize the direction of the jet flow. The internal combustion engine according to the second embodiment can effect the evaporation of the gasoline more effectively than the first embodiment so that the combustion is high in efficiency and the improvement in the fuel consumption rate can be attained while preventing the emission of the noxious contents. In other words, the aforementioned skirt portion 51 and projection 34 can enhance the injecting and evaporating effects.

Since, moreover, the skirt portion 51 and the projection 34 of the present second embodiment are heated to high temperatures because they are exposed to the hot gases in the combustion chamber, they can enjoy an advantage that the mixture passing therebetween in the form of droplets or liquid film can be instantly evaporated while being prevented from being caught thereby, thus further enhancing the evaporating effects of the gasoline.

Since, moreover, the gasoline is evaporated from the surface of the wall of the combustion chamber 4, the internal combustion engine according to the present second embodiment can enjoy another advantage that a less expensive injection valve can be employed because it is not necessary, as is required by the conventional injection valve, that the gasoline be sufficiently gasified by the injection valve itself.

Figure 10:
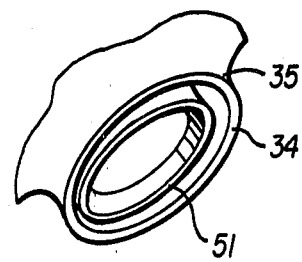
FIGS. 10 and 11 are views showing a modification of the second embodiment.
Figure 11:
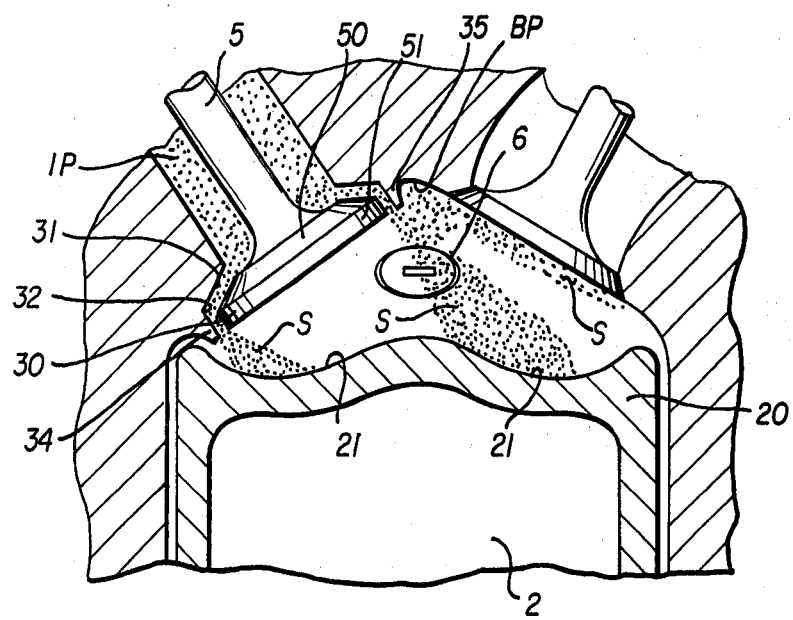

As shown in FIGS. 10 and 11, on the other hand, the internal combustion engine of the present second embodiment can be modified into a mode where the annular projection 34 formed in the valve seat 31 is formed with a notch 35 in the vicinity of the exhaust valve 8.

According to this modification, since the notch 35 is arranged on a portion of the annular projection 34 directed toward a lower flat surface of the exhaust valve 8, a jet of the gasoline-air mixture is made to impinge upon the W-shaped recess 21 of the head portion 20 of the piston 2 in a manner similar to the second embodiment, and also a jet having passed through the aforementioned notch 35 can be partially made to impinge upon the lower dish-shaped portion of the exhaust valve 8, as shown in FIG. 11. As a result, the present first modification can enjoy an advantage that the lower dish-shaped portion of the exhaust valve 8 can also be used as a wall surface for effecting the evaporation so that the area for the surface evaporation can be so increased as to enable more gasoline to be evaporated.

Moreover, the present first modification can enjoy other advantages in that it can provide auxiliary effects that the annular projection 34 is partially cut away to form the notch 35 so that the mixture having passed through the intake valve 5 is partially fed directly to the vicinity of the ignition plug 6 thereby to facilitate ignition or that the inner wall of the combustion chamber 10 between the intake valve 5 and the exhaust valve 8, i.e., the bridge portion BP can be cooled down.

In this first modification, the exhaust valve 8 has to be closed before the intake valve 5 is opened. This is because of the fear of an unburned mixture being discharged through the exhaust valve without performing any work if there is a time period during which the two valves are simultaneously opened.

Figure 12:
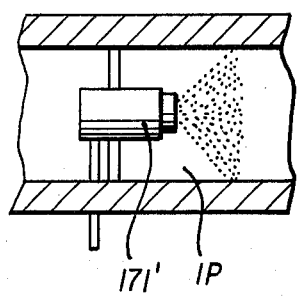
FIG. 12 is a view showing another modification of the second embodiment.

Moreover, although the electromagnetic injection valve 171 is arranged at an inclination to inject the gasoline obliquely upwardly into the intake passage IP, the present second embodiment can be so modified, as shown in FIG. 12, so that an injection valve of the swirl or impingement type 171' having a wide injection angle is used in place of the electromagnetic injection valve to inject the gasoline toward the whole inner wall of the intake passage IP. This second modification enjoys another advantage that the gasoline can be uniformly evaporated to make combustion possible.

Figure 13:
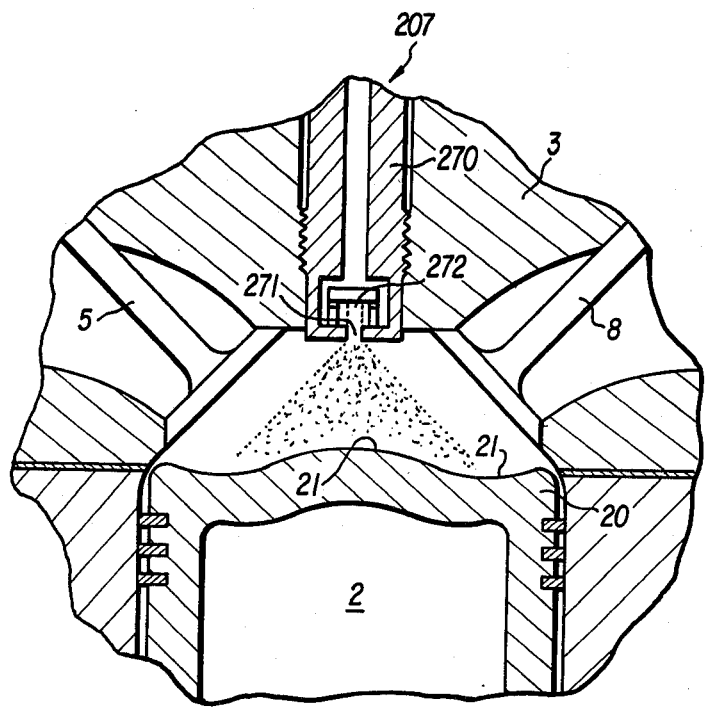
FIG. 13 is a sectional view showing a third embodiment of the present invention.

The present invention will now be further described in connection with the internal combustion engine according to the third embodiment as shown in FIG. 13, which belong to the second aspect according to the present invention.

As shown in FIG. 13, the internal combustion engine of the third embodiment comprises a piston type gasoline engine. It is of the type in which the metered gasoline is injected directly into the combustion chamber by means of a fuel injection means. The description is centralized upon the differences from the aforementioned embodiments, and identical parts are indicated at identical characters so that their repeated description will be omitted.

The fuel supply means 207 to be used in the internal combustion engine of the present third embodiment is constructed to include a swirl injection valve 270 extending through the cylinder head 3 and having its injection port 271 exposed to the space in the combustion chamber 4, an air flow meter made similar to that of the aforementioned second embodiment for detecting the quantity of the air sucked into the intake passage IP, a tachometer for detecting the revolutions of the engine, a control unit made responsive to the signals indicative of the quantity of the sucked air and the revolutions of the engine for generating the signals to control the quantity of the gasoline to be injected in accordance with the running conditions of the engine while taking the temperature of the engine cooling water into consideration, and a fuel supply device for supplying the injection valve with such a quantity of gasoline under pressure as accords the control signals.

In the swirl injection valve 270, a predetermined quantity of the gasoline supplied under pressure from the fuel supply device is introduced tangentially into a swirl chamber 272 through a communication port which is tangentially opened to the swirl chamber to generate intense swirling flows in the swirl chamber 272 so that a thin film of the gasoline is injected at a wide injection angle from the injection port 271 to the W-shaped recess 21 of the head portion 20 of the piston 2.

Since the thin film of the gasoline having impinged upon the W-shaped recess 21 is instantly evaporated from the surface thereof so that it is substantially completely gasified by the igniting time, the internal combustion engine according to the present third embodiment can enjoy the operational effects that the combustion can be performed at high efficiency, that the fuel consumption rate can be improved and that the unburned noxious contents such as hydrocarbons can be prevented from being emitted as well as similar operational effects to those of the aforementioned embodiments.

Since, moreover, the thin film of the gasoline can be injected at the most proper angle from the most proper position to the W-shaped recess 21 of the head portion of the piston 2, the internal combustion engine according to the present third embodiment can enjoy an advantage that the evaporating effects can be made uniform. Since, moreover, the metered gasoline is supplied directly into the combustion chamber, the internal combustion engine can enjoy another advantage that its responsiveness can be improved without a drawback of gasoline remaining in the intake passage.

Although the internal combustion engine of the present third embodiment adopts the swirl injection valve 270 as a fuel injection valve, any injection valve can be used if it has a wide injection angle. For instance, the injection valves shown in FIGS. 14 and 15 can also be adopted.

Figures 14, 15:
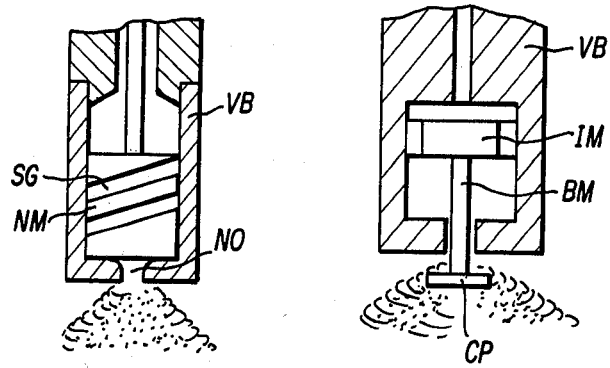
FIGS. 14 and 15 are sectional views showing modifications of the injection valve.

In the injection valve shown in FIG. 14, a nozzle member NM fitted in a valve body VB is formed on its outer periphery with a spiral groove SG to spirally guide the gasoline while imparting a centrifugal force thereto so that a thin film of the gasoline may be injected at a wide injection angle from a nozzle opening NO.

The injection valve shown in FIG. 15 is the so-called impingement valve, in which the gasoline is injected from the nozzle opening NO to impinge upon an impingement plate CP which is fixed through a bar member BM to an intermediate member IM fitted in the valve body VB so that the thin film of the gasoline may be injected at the wide injection angle while being extended by said impingement plate CP.

The present invention will be further described in the following in connection with an internal combustion engine according to fourth to seventh embodiments as shown in FIGS. 16 to 24, which belong to the third aspect according to the present invention. The internal combustion engines of fourth to seventh embodiments comprises a dual chamber type internal combustion engine with an auxiliary combustion chamber.

Figure 16:
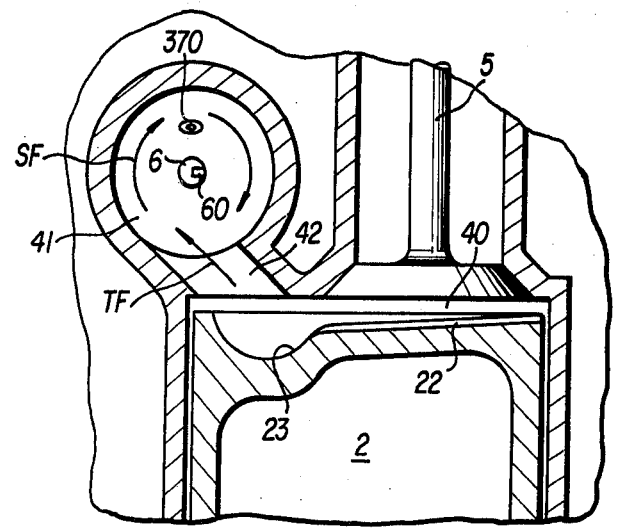
FIGS. 16 and 17 are sectional views showing the fourth embodiment of the present invention.
Figure 17:
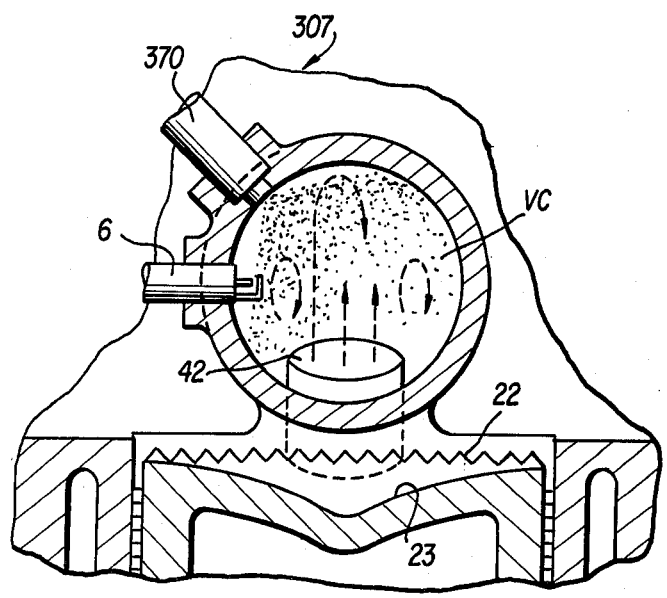

According to the internal combustion engine of the fourth embodiment, as shown in FIGS. 16 to 17, the combustion chamber 4 is divided into a main combustion chamber 40 (which will be referred to as a second combustion chamber) and an auxiliary combustion chamber 41 (which will be referred to as a first combustion chamber). The metered gasoline is injected into the first-named combustion chamber 41 by fuel supply means 307 and the fuel injection valve 370 thereof so that is is evaporated from the surface of the inner wall of the first combustion chamber 41. Therefore, the internal combustion engine of the fourth embodiment corresponds to the second example of the third aspect of the present invention. The description is centralized upon the differences from the aforementioned embodiments, and identical characters are used to avoid repeated explanation.

The combustion chamber 4 comprises the second combustion chamber 40 as a main combustion chamber and the first combustion chamber 41 as an auxiliary combustion chamber, the latter of which has communication with the former 40 through a communication port 42 opened tangentially into the first combustion chamber 41. As a result, the air sucked into the second combustion chamber 40 is introduced tangentially into the first combustion chamber 41 through the tangential communication port 42 so that an intense or strong swirling flow SL is generated in the first-named combustion chamber 41, as seen from FIGS. 16 and 17. Incidentally, the volumetric ratio of the second combustion chamber 40 to the first combustion chamber 41 is preset at 1:1.

The piston 2, which is fitted in the second combustion chamber 40 in a reciprocally movable manner, is formed on the surface of its head portion 20 with a plurality of fins 22 having a triangular section, which are arranged in parallel with the axial direction of the aforementioned tangential communication port 42. The piston 2 is further formed on the surface of its head portion 20 with a recess 23 which is arranged in the vicinity of the aforementioned tangential communication port 42. The recess 23 thus formed is so made, as shown in FIG. 17, that it is deepest at a position facing the tangential communication port 42 and is gradually shallower toward the peripheral edge thereof until it merges into the aforementioned fins 22.

The igniting means 6 is so arranged as to have its igniting portion 60 opened into the first combustion chamber at the center portion of the swirling flow generated in the first combustion chamber 41.

The fuel supply means 307 is constructed to include the swirl type fuel injection valve 370 similar to that of the aforementioned third embodiment, which has its injection port opened into the first combustion chamber 41 in the vicinity of the aforementioned igniting means 6, so that a thin film of gasoline is injected at a wide angle (ranging from 90 to 120 degress) to wet substantially the whole area of the inner wall of the first combustion chamber 41, as shown in FIG. 17.

In the internal combustion engine having the aforementioned construction according to the present fourth embodiment, as shown in FIG. 17, the injection of the gasoline is performed at the end of the suction stroke or at the beginning of the compression stroke, at the far wider angle (ranging from 90 to 120 degrees) than that of the general or normal injection valve, from the swirl type injection valve 370 so that all of the gasoline is promptly gassified from the inner wall surface of the first combustion chamber 14 heated at a high temperature.

Thus, the gasoline is brought onto the hot wall surface so that the gasifying rate is increased from several times to several ten times that for the case in which the gasoline is gasified in a hot gas.

As seen from FIG. 16, the first combustion chamber 41 is so shaped that a swirling flow (or vortex flow) SF can be easily generated. As a result, the swirling flow (or vortex flow) SF having a high rotational velocity is generated in the first combustion chamber 41 during the compression stroke by the tangential flow TF which tangentially comes from the second combustion chamber 40 to the first combustion chamber 41.

Since the vortex or swirling flow is generated from the second combustion chamber 40 to the first combustion chamber 41, the gasoline droplets injected into the first combustion chamber 41 are brought to wet the hot inner wall surface of the first combustion chamber 41 by the centrifugal force due to this vortex flow and are instantly evaporated so that the gasoline vapors are turned together with the vortex flow. As a result, the gasoline in the liquid state will not flow into the second combustion chamber during the compression stroke.

As to the flow into the first combustion chamber from the second combustion chamber during the compression stroke, more specifically, if the effective area of the tangential communication port 42 between the first and second combustion chambers is made sufficiently large, the pressure difference between the second combustion chamber 40 and the first combustion chamber 41 is so reduced that the swirling flow (or vortex flow) in the first combustion chamber 41 does not become a natural vortex but a forced vortex which is rotating in a solid body as a whole.

For either the natural vortex or the forced vortex, however, there are generated such vortex centers as are indicated at letters VC in FIG. 17.

Since the velocity of the mixture flow at any of the vortex centers VC is zero, if the igniting means 6 is arranged at the vortex center VC, as shown in FIGS. 16 and 17, so as to effect the ignition, the mixture of the gasoline vapors and the air in the first combustion chamber 41 can be ignited without any difficulty.

The mixture thus ignited and exploded in the first combustion chamber 41 flows in the form of a flame jet into the second combustion chamber 40 through the tangential communication port 42.

The piston 2 has its head surface formed in the direction of the flow from the tangential communication port 42 with a plurality of grooves having a substantially triangular section, which in turn form the plural triangular fins 22. Since the height of said fins 22 is also made larger than the thickness (of about 1 to 3 mm) of the thermal boundary layer on the head surface of the piston, the crests of the triangular fins 22 are heated to a high temperature so that the temperature of the bases of the fins 22 is accordingly raised by the thermal conduction from the crests thereof.

In response to the temperature rise in the fins 22, the thickness of the quenching layer of the second combustion chamber 40 is so reduced that the flame jet can pass through the clearance between the upper wall of the second combustion chamber and the head portion of the piston 2 without being quenched.

Since, however, the flame jet is mixed with the air in the second combustion chamber simultaneously as it enters the same, the temperature of the flame jet becomes lower than that of the flame jet at the instant when it spurts from the first combustion chamber 41 so that the emission of nitrogen monoxide (NO) is restrained in the main combustion chamber 40 while allowing only the unburned hydrocarbons (HC) to be burned therein.

When it is intended to run the present engine at a high output, the gasoline is injected into the first combustion chamber 41 at a time between the end of the suction stroke and the beginning of the compression stroke.

In this case, only fine gasoline droplets failing to contact with the inner wall of the first combustion chamber 41 are allowed to flow into the second combustion chamber 40 so that the mixture of the fine gasoline droplets and the air is prepared in the second combustion chamber 40 and the first combustion chamber 41, thus increasing the resultant output.

Where, on the contrary, the engine is run at a low output, the injection is effected during the compression stroke. In this case, the mixture of the gasoline vapors and the air is prepared in the first combustion chamber 41 so that the second combustion chamber 40 is supplied only with the air, thus decreasing the resultant output.

Thus, if the quantity and timing of the injection is adjusted, the air-fuel ratio in the first combustion chamber 41 can be held at a lever proper for the ignition, and the output obtainable can be varied over a wide range.

Since, moreover, the first combustion chamber 41 has a raised knocking limit due to its construction, it is possible to lower the fuel consumption rate by increasing the compression ratio and to effect supercharging as the case may be.

In the internal combustion engine according to the present fourth embodiment, therefore, the gasoline is evaporated from the inner wall surface of the first combustion chamber 41 in a similar manner to that of the aforementioned embodiments so that the combustion high in efficiency is made possibly thereby to improve the fuel consumption rate and to prevent the emission of unburned noxious contents such as hydrocarbons.

The present invention will now be further described in connection with the internal combustion engine according to a fifth embodiment thereof.

In the internal combustion engine according to the fifth embodiment, as shown in FIG. 18, the gasoline is evaporated from the inner wall surface of the first combustion chamber 41 in a similar manner to that of the fourth embodiment. In order to supply the first combustion chamber 41 with gasoline, more specifically, there is used a fuel supply means 407 which is constructed to include a (not-shown) carburetor and an intake valve mechanism 470 for the auxiliary (or first) combustion chamber, in place of the swirl type injection valve. Thus, the internal combustion engine of the present fifth embodiment corresponds to the first example of the third aspect of the present invention, and the following description is made by describing the differences from the aforementioned embodiments.

In the fuel supply means 407, more specifically, the carburetor explained in the aforementioned first embodiment is used as the (not-shown) carburetor for the first combustion chamber, and a quantity of the mixture of the gasoline and air as accords to the throttle opening is injected at a large injection angle into the auxiliary combustion chamber 41 with the flowing direction of the mixture extended by the dish-shaped valve member 471 having an inverted T-shaped longitudinal section for the intake valve mechanism 470.

Since the gasoline is evaporated from the inner wall surface of the first combustion chamber 41 in a similar manner to that of the aforementioned fourth embodiment, the piston type gasoline engine having the aforementioned construction according to the fifth embodiment can enjoy the operational effects that combustion can be performed highly efficiently, that the fuel consumption rate can be improved and that the emission of the unburned contents such as hydrocarbons can be prevented as well as operational effects similar to those of the aforementioned fourth embodiment.

Now, a sixth embodiment of the present invention will be described with reference to the accompanying drawings, which embodiment is corresponding to the third example of the third aspect of the present invention. The internal combustion engine according to the sixth embodiment is a four-cycle spark ignition type reciprocating engine, to which the present invention is applied, as shown in FIGS. 19 to 21. The engine body is constructed to include the cylinder head 3 and the cylinder block 1. On the other hand, the combustion chamber is constructed to include a first combustion chamber 41 and a second combustion chamber 40. The cylinder block 1 is formed with a cylinder. Within the cylinder, there is reciprocally arranged the piston 2 which is made coactive with the (not-shown) crank-shaft through a connecting rod 740. The piston 2 has its upper portion 741 formed with a recess 742 so that the secondary combustion chamber 40 having a small volume is formed among the recess 742, the cylinder and the cylinder head 3. The recess 742 is shaped, as shown in FIG. 19, such that it is the deepest at a portion facing the later-described tangential communication port 743 and is gradually shallowed toward its circumferential edge. The cylinder head 2 is formed with an intake port 744 having communication with the intake passage IP and an exhaust port having communication with the exhaust passage (both being now shown) such that the two ports are opened to have communication with the secondary combustion chamber 40 and such that the intake valve 5 and the exhaust valve are so arranged in the respective two ports as to be opened and closed at preset timings in synchronization with the rotation of the engine. The intake passage IP is adapted to supply the air to the aforementioned second combustion chamber 40 through an air cleaner $A_1$ and an air valve $A_2$. On the other hand, the cylinder head 3 is formed above the aforementioned second combustion chamber 40 with the primary combustion chamber 41 which has a larger volume and which has communication with the second combustion chamber 40 through the tangential communication port 743. This port 743 has its axis extending tangentially along the inner wall 745 of the first combustion chamber 41. As a result, the air flow 29 introduced into the second combustion chamber 40 is further introduced into the first combustion chamber 41 tangentially through the communication port 743 to thereby generate high velocity or intense vortex flows in the first combustion chamber 41, as seen from FIG. 19.

The fuel supply means of the dual chamber type internal combustion engine according to the present sixth embodiment is constructed to include a swirl injection valve 748, which has its injection port 747 opened into the first combustion chamber 41, an air flow meter for detecting the flow rate of the intake air into the intake passage IP, a tachometer for detecting the R.P.M. of the engine, a control unit, which is made responsive to the signals indicative of the aforementioned flow rate of the intake air and the R.P.M. of the engine, while taking the temperature of the engine cooling water into consideration, so as to generate such signals as can control the injection rate of the fuel, e.g., gasoline in accordance with the running conditions of the engine, and a fuel supply device for supplying the gasoline under pressure in a quantity according to the control signals to the swirl injection valve 748 (the latter constituents being not shown). The swirl injection valve 748 is of the electromagnetic or electronic control type, as shown in FIGS. 20 and 21, in which a preset quantity of pressurized gasoline supplied from the fuel supply device is introduced into a vortex or swirl chamber 749 tangentially through a tangential passage 750 to generate intense or strong swirling flows in the vortex chamber 749 so that a thin film of gasoline is injected through a needle valve 751 over the whole area of the inner wall 745 of the first combustion chamber 41 at a wider injection angle (e.g., 90 to 120 degrees) from an injection port 752 of the injection valve 748. On the other hand, the ignition means is arranged in the vicinity of the aforementioned swirl injection valve 748 such that the spark plug 6 has its ignition portion 60 opened into the substantial center 753 of the swirling flows which are located in the first combustion chamber 41.

The dual chamber type internal combustion engine thus constructed according to the sixth embodiment injects the gasoline at the end of the intake stroke or at the beginning of the compression stroke of the engine from the swirl injection valve 748 which can inject the atomized fuel at a far wider angle (e.g., 90 to 120 degrees) than a usual injection valve so that all the gasoline can be abruptly evaporated and gasified on the inner wall 745 of the first combustion chamber 41 heated at a preset temperature. By bringing the gasoline into contact with the wall surface at a hot temperature in such a way, the gasoline is efficiently gasified on the hot wall surface so that the gasification rate can be increased several or several ten times.

The combustion chamber 41 is formed, as shown in FIG. 19, into such a shape as can generate the vortex or swirling flows therein without any difficulty. As a result, the vortex flows 746 having high swirling velocity are generated without fail in the first combustion chamber 41 by the flow which is introduced during the compression stroke from the second combustion chamber 40 tangentially through the tangential communication port 743 into the first combustion chamber 41.

In this way, since the vortex flows introduced from the second combustion chamber 40 into the first combustion chamber 41 are generated, the droplets of the gasoline injected into the first combustion chamber 41 are carried to swirl together with the vortex flows 746 until they are brought into contact with the inner wall 745 of the first combustion chamber 41 by the centrifugal force of the swirling flows so that they are instantly vaporized. The resultant gasified fuel is mixed with the intake air to a satisfactory extent. During the compression stroke, therefore, the vortex flows in the first combustion chamber swirl so intensely that they are kept free from entering the second chamber 40. During the compression stroke, however, there are flows from the second combustion chamber 40 into the first combustion chamber 41. Since the pressure difference between the second and first combustion chambers 40 and 41 becomes small if the effective area of the tangential communication port 743 therebetween is made sufficiently large, the vortex flows in the first combustion chamber 41 become not the so-called natural vortex but rather a forced vortex which is turning in a solid body as a whole. In either the aforementioned natural or forced vortex, however, such vortex or swirling center 753 is established in the first combustion chamber 41 as is seen from FIG. 19.

Since, moreover, the turning velocity of the mixed air flow is zero at the vortex center 753, the spark plug 6 is arranged at the vortex center 753, as shown in FIG. 19. If the ignition is performed by the spark plug 6 thus arranged, the mixture gases of the gasoline vapors and the air in the first combustion chamber 41 can be ignited without any difficulty. After that, the mixture gases, which have been ignited to explode in the first combustion chamber 41, flow as a flame jet into the second combustion chamber 40 through the tangential communication port 743 until the flame reaches substantially the entire area of the second combustion chamber 40 by its own jet force. The flame jet is mixed, at the instant when it enters the second combustion chamber 40, with the air therein so that its temperature becomes lower than that of the jet flame at the instant when it is injected from the first combustion chamber 41. As a result, the generation of nitrogen monoxide (NO) in the second combustion chamber 40 can be completely depressed so that only the unburned hydrocarbons (HC) are burned out in the chamber 40. On the other hand, the internal combustion engine of the present sixth embodiment inject the gasoline into the first combustion chamber during the period from the end of the intake stroke to the beginning of the compression stroke where it is run under a high output condition. Since, in this instance, only the gasoline droplets of such small size as will fail to contact with the inner wall of the first combustion chamber 41 are introduced into the second combustion chamber 40, the mixture of the fine gasoline droplets with air and the mixture of the gasoline vapor with air are generated in the second and first combustion chambers 40 and 41, respectively, so that the engine output obtainable can be increased. On the contrary, when the engine is run under a low output condition, the gasoline is injected during the compression stroke into the first combustion chamber 41. In this case, the mixture of the gasoline vapor and the air is generated in the first combustion chamber 41, but only the air prevails in the second combustion chamber 40 so that the engine output is decreased.

Thus, the dual chamber type internal combustion engine of the present sixth embodiment can enjoy the excellent practical effects that the air-fuel ratio in the first combustion chamber 41 can be held at a proper value for the ignition by adjusting the injection rate and timing of the fuel while making it possible to vary the engine output over a wide range. Since, moreover, the aforementioned first combustion chamber 41 is of a construction which has a high knocking limit, the fuel consumption rate can be decreased by increasing the compression ratio, and supercharging can be effected, if necessary.

As a result, the dual chamber type internal combustion engine of the present sixth embodiment can attain the significant practical effect that the gasoline is evaporated efficiently and accurately from the surface of the inner wall 745 of the first combustion chamber 41 to make highly efficient combustion possible so that the running operation of the engine can be stabilized and smoothened, so that the fuel consumption rate can be improved and so that the noxious contents such as hydrocarbons and nitrogen oxides can be prevented from being emitted.

Figure 22:
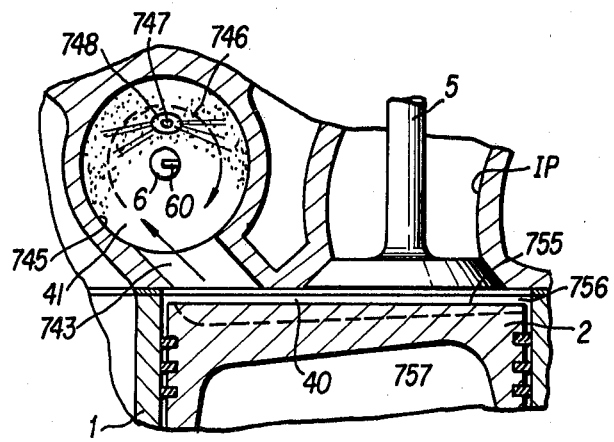
FIGS. 22 to 24 are sectional views showing the seventh embodiment of the present invention.
Figure 23:
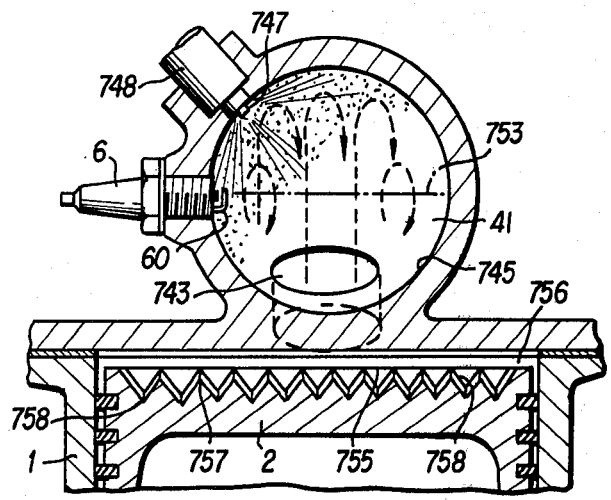
Figure 24:
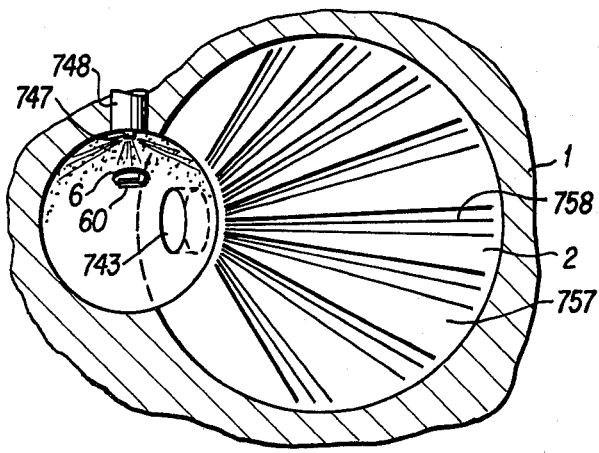

Now, the internal combustion engine according to a seventh embodiment of the present invention will be described with reference to FIGS. 22 to 24.

The internal combustion engine of the seventh embodiment is similar to the foregoing respective fourth to sixth embodiments in that the gasoline is evaporated on the inner wall 745 of the first combustion chamber 41. When it is intended to guide the flame, which is generated in the first combustion chamber 41, in the narrow clearance 756 which is formed between the upper wall of the second combustion chamber 40 and the facing head portion 755 of the piston 2, the head portion 755 is formed with fins 757 which are used as the corrugated heat transfer portion at a preset temperature. The following descriptions will stress the differences from the foregoing embodiments.

The head portion 755 of the piston 2 providing the lower wall of the second combustion chamber 40 is a generally flat surface. The head portion 755 of the piston 2, as shown in FIGS. 22 to 24, is formed with a plurality of triangular fins 757 which are radial about the communication port 743, which are in parallel along the axial direction of the communication port 743 and which are formed with grooves 758 having a generally triangular section.

The triangular fins 757 thus formed have a larger height than the thickness (about 1 to 3 mm) of the temperature boundary layer above the head surface of the piston 2 whereby the temperature at the triangular vortexes of the fins 757 are raised so that the triangular bottoms of the fins 757 may be heated by the heat conduction therebetween. The fins 757 are arranged, as shown in FIG. 24, at the head portion 755 of the piston 2 such that they extend from the vicinity of the tangential communication port 743 toward the circumferential edge, and are formed, as shown in FIG. 22, such that they are the deepest adjacent to the communication port 743 and become gradually shallower toward the circumferential edge thereof.

In the internal combustion engine thus constructed according to the seventh embodiment, the flame jet, which is supplied from the aforementioned first combustion chamber 41 through the communication port 743 into the second combustion chamber 40, can be guided reliably without being quenched through the facing narrow clearance 756 between the upper wall of the second combustion chamber 40 and the head portion 755 of the piston 2 by reducing the thickness of the quenching layer in the second combustion chamber 40 as a result of the temperature rise in the aforementioned fins 757 and also by using the guiding actions of the fins 757 so that the flame jet can reach the entire area of the second combustion chamber 40 more deeply than the aforementioned respective embodiments. As a result, the dual chamber type internal combustion engine of the present seventh embodiment can attain the more excellent effects than the foreoing respective embodiments in that the satisfactory propagation of the flame jet in the second combustion chamber 40 can be ensured and in that noxious contents such as hydrocarbons and nitrogen oxides can be prevented from being discharged.

The internal combustion engine of the seventh embodiment can also attain the result, similarly to the aforementioned respective fourth to sixth embodiments, that the gasoline can be evaporated from the surface of the inner wall 745 of the first combustion chamber 41 and that highly efficient combustion can be ensured to improve the fuel consumption rate in addition to other effects similar to those of the foregoing embodiments.

Figure 25:
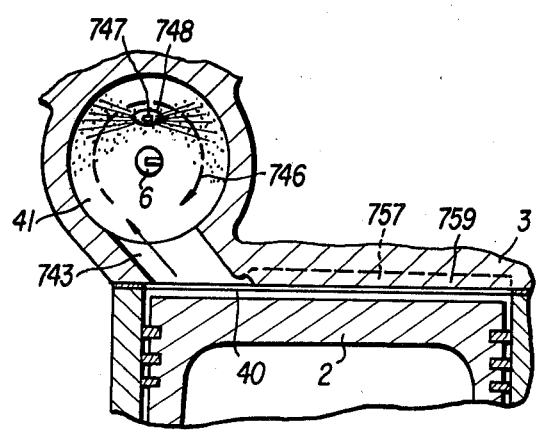
FIGS. 25 to 28 are sectional views showing the modifications of the fourth, sixth and seventh embodiments of the present invention.
Figure 26:
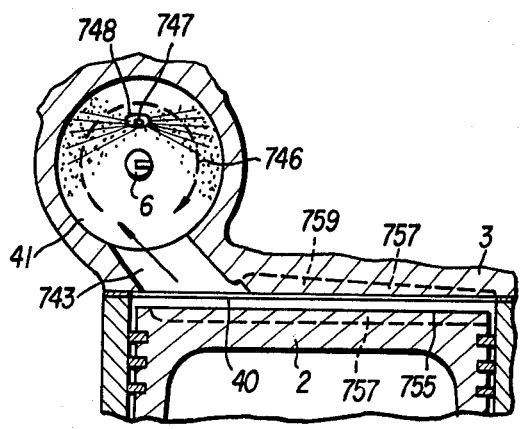

Although, in the seventh embodiment thus far described, the fins 757 are formed in the head wall 755 of the piston 2, which forms the lower wall of the second combustion chamber 40, the present invention should not be limited to such construction but can be extended to various modifications including those shown in FIGS. 25 and 26. In the modification shown in FIG. 25, the fins 757 are formed at the side wall 759 of the cylinder head 3, which forms the upper wall of the second combustion chamber 40. In another modification shown in FIG. 26, the plural fins 757 are formed on both of the upper and lower walls of the second combustion chamber, i.e., on the head portion 755 of the piston 2 and the side wall 758 of the cylinder head 3 and are arranged in parallel with the axial direction of the aforementioned communication port 743. The modifications can attain effects similar to those of the aforementioned respective embodiments.

Figure 27:
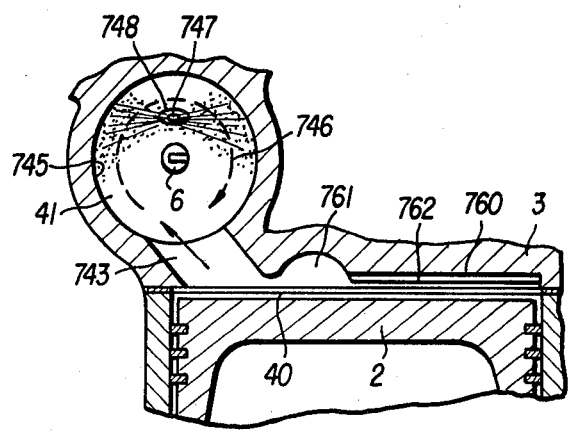
Figure 28:
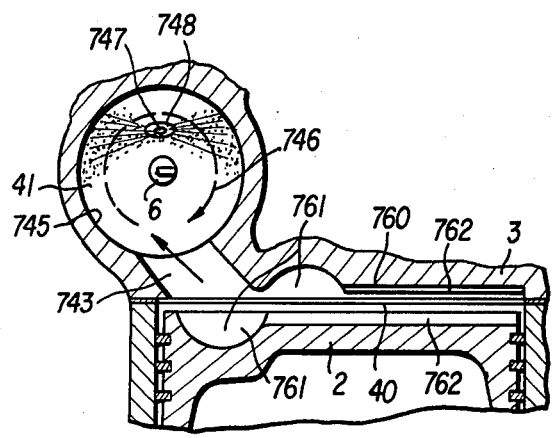
Figure 29:
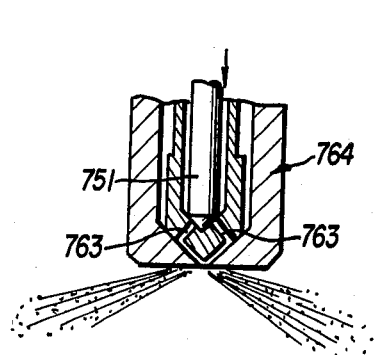
FIGS. 29 to 32 are sectional views showing the modifications of the injection valve.
Figure 30:
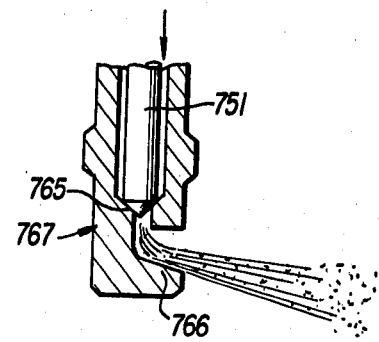
Figure 31:
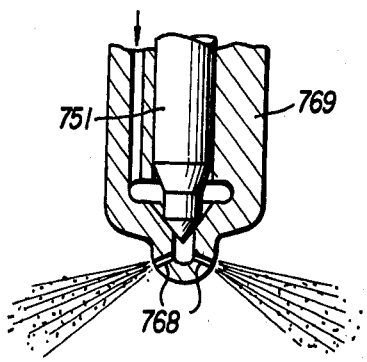
Figure 32:
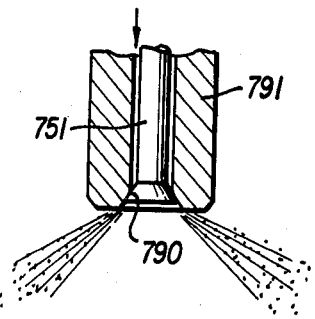

Although, in the foregoing embodiments, the recess and the fins are arranged on the head portion of the piston 2, which forms the lower wall of the second combustion chamber 40, the present invention should not be limited to such construction but can be extended to various modifications including those shown in FIGS. 27 and 28. In the modification shown in FIG. 27, a recess 761 and a plurality of fins 762 are formed at the end wall 760 of the cylinder head 3, which forms the upper wall of the second combustion chamber 40, and are arranged to correspond to the direction of the communication port 743. In another modification shown in FIG. 28, the recess 761 and the fins 762 are formed in both the upper and lower walls of the second combustion chamber 40, i.e., on the head portion of the piston 2 and the end wall 760 of the cylinder head 3. These modifications can attain effects similar to those of the aformentioned respective embodiments.

On the other hand, although the fins in the foregoing embodiments are formed to have a triangular section, they can take other shapes such as trapezoidal, arcuate or rectangular in modifications of the invention if they can provide the heat transfer portion at the preset temperature. These modifications can also attain effects similar to those of the aforementioned respective embodiments.

Still moreover, although, in the foregoing respective embodiments, the fuel injection valve employed is of swirl type, the present invention should not be limited to such construction but can be extended to modifications including those shown in FIGS. 29, 30, 31 and 32. In the modification shown in FIG. 29, the fuel injection valve is an impingement nozzle 764, by which the fuel is injected in the form of a liquid film into the first combustion chamber over a wide area by the impingements among the fuel jets which have just been injected from injection ports 763. In another modification shown in FIG. 30, the fuel injection valve is a deflection nozzle 767, in which the fuel is made to impinge upon a guide member 766 provided downstream of an injection port 765 to change the direction of the injected fuel flow so that the fuel may be injected in the form of a liquid film into the aforementioned first combustion chamber over a wide area. In still another modification shown in FIG. 31, the fuel injection valve is a holed nozzle 769 having a single or plural holes, by which the fuel is injected from injection ports 768 toward the inner wall of the first combustion chamber thereby to wet a wide area of the inner wall of the first combustion chamber. In a further modification shown in FIG. 32, the fuel injection valve a diverging injection valve 791, by which the fuel is injected at a wide angle by using the conical portion 790 of the needle valve 751. These modifications can also attain effects similar to those of the aforementioned respective embodiments.

Although only representatives of the present invention have been described hereinbefore in connection with the embodiments and modifications, the present invention should not be limited thereto but can be so further modified to allow the embodiments to interchange their components or parts.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An internal combustion engine comprising:
   a piston reciprocally movable within a cylinder for affording the rotational motions to a crankshaft;
   a combustion chamber formed among said piston, said cylinder and a cylinder head;
   an intake valve mechanism for opening and closing an intake passage to be communicated with said combustion chamber;
   igniting means having its igniting portion facing said combustion chamber;
   at least one evaporation portion formed of a predetermined wall of said combustion chamber within said combustion chamber and heated to a predetermined high temperature by the combustion in said combustion chamber;
   fuel supply means for supplying a predetermined quantity of fuel toward said evaporation portion in said combustion chamber; and
   an exhaust valve mechanism for opening and closing an exhaust passage to be communicated with said combustion chamber;
   whereby the fuel is brought by said fuel supply means, during the running operation, into contact with said evaporation portion of said combustion chamber, said fuel being evaporated from the surface of said evaporation portion, so that the gasification of the fuel is promoted to effect combustion with high efficiency and to prevent emission of unburned noxious contents such as hydrocarbons; and
   wherein said combustion chamber comprises:
   a first combustion chamber formed within said cylinder head;
   a second combustion chamber communicated with said first combustion chamber through a tangential communication port; and
   said fuel supply means have a supply port arranged in a predetermined position of an inner wall of said first combustion chamber, thereby supplying the fuel to a substantially wide area of an inner wall of said first combustion chamber so that the supplied fuel may be evaporated from the surface of said inner wall of said first combustion chamber;
   wherein said piston has a recess arranged in the vicinity of said tangential communication port and a plurality of V-shaped recesses provided in parallel to the axis of said communication port and connected to said recess and forming a large surface area portion.

2. An internal combustion engine according to claim 1, wherein
   said fuel supply means inject and supply the fuel to at least one of a top portion of said piston, a lower flat portion of said exhaust valve, a wall of a first combustion chamber and an upper wall portion of said combustion chamber excepting said exhaust valve and intake valve, all of which constitute said evaporation portion.

3. An internal combustion engine according to claim 1, wherein said fuel supply means comprise a fuel injector, having an injection port of a wide injection angle opening to said first combustion chamber and directed toward the inner wall of said first combustion chamber, for injecting a metered quantity of the fuel from said injection port in a predetermined timing in synchronism with the rotation of said crankshaft.

4. An internal combustion engine according to claim 3, further comprising:
   vortex forming means for forming vortex or swirling flows having a high turning velocity within said first combustion chamber.

5. An internal combustion engine according to claim 4, wherein:
   said igniting means has its igniting portion provided at a predetermined position of the wall of said first combustion chamber coinciding with the central portion of the vortex or swirling flows formed in the first combustion chamber.

6. An internal combustion engine according to claim 1, wherein:
   said second combustion chamber is formed with a lower wall of said cylinder head, a side wall of said cylinder and a top wall of said piston and has a large surface area in at least one of said lower wall of said cylinder head and said top wall of said piston,
   whereby the supplied fuel may be effectively evaporated from said wall of the large surface area.

7. An internal combustion engine according to claim 5, wherein
   said fuel injector of said fuel supply means comprises a swirl type injection valve having an injecting nozzle provided at an upper wall of said first combustion chamber, for injecting a metered quantity of fuel from said injecting nozzle at a wide injection angle in response to an air flow rate signal, igniting signals and a temperature signal of the engine cooling water.

8. An internal combustion engine according to claim 7 wherein
   said vortex forming means comprise said communication port opening tangentially to said first combustion chamber.

9. An internal combustion engine according to claim 1 wherein said first combustion chamber is of thin wall construction.

* * * * *

UNITED STATES PATENT AND TRADEMARK OFFICE
CERTIFICATE OF CORRECTION

PATENT NO. : 4,398,513

DATED : August 16, 1983

INVENTOR(S) : Yasusi Tanasawa et al

It is certified that error appears in the above-identified patent and that said Letters Patent is hereby corrected as shown below:

-- [22] Filed:

January 28, 1980 --

-- [30] Foreign Application Priority Data

January 31, 1979   Japan.........54-10758

January 31, 1979   Japan.........54-10759      --.

Signed and Sealed this

Eighth Day of May 1984

[SEAL]

Attest:

Attesting Officer

GERALD J. MOSSINGHOFF

Commissioner of Patents and Trademarks